(12) United States Patent
Copner et al.

(10) Patent No.: US 6,671,434 B2
(45) Date of Patent: Dec. 30, 2003

(54) OPTICAL PERFORMANCE MONITOR

(75) Inventors: Nigel Copner, Fremont, CA (US); Frank Liang, San Jose, CA (US); Robert Maaskant, King City (CA); Keith Beckley, King City (CA); A. Tino Alavie, Richmond Hill (CA)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/124,653

(22) Filed: Apr. 17, 2002

(65) Prior Publication Data
US 2002/0168142 A1 Nov. 14, 2002

Related U.S. Application Data

(60) Provisional application No. 60/283,931, filed on Apr. 17, 2001.

(51) Int. Cl.[7] ............................................... G02B 6/34
(52) U.S. Cl. ........................... 385/37; 385/15; 385/24; 385/31
(58) Field of Search ............................. 385/15, 24, 31, 385/37

(56) References Cited

U.S. PATENT DOCUMENTS

| 5,680,235 | A | * | 10/1997 | Johansson | 359/110 |
|---|---|---|---|---|---|
| 6,055,348 | A | * | 4/2000 | Jin et al. | 385/37 |
| 6,169,831 | B1 | * | 1/2001 | Adams et al. | 385/37 |
| 6,275,629 | B1 | * | 8/2001 | Eggleton et al. | 385/37 |
| 6,415,079 | B1 | * | 7/2002 | Burdge et al. | 385/37 |
| 6,546,167 | B1 | * | 4/2003 | Chen et al. | 385/24 |
| 2001/0051019 | A1 | * | 12/2001 | Bailey et al. | 385/37 |

* cited by examiner

*Primary Examiner*—Phan T. H. Palmer
*Assistant Examiner*—Jennifer Doan
(74) *Attorney, Agent, or Firm*—Allen, Dyer, Doppelt, Milbrath & Gilchrist, P.A.

(57) ABSTRACT

An optical performance monitor having a tunable fiber grating sandwiched between the first and second reflective surfaces of a fiber etalon provides high sensitivity, while simultaneously monitoring an optical data signal. Individual channels within the optical data signal are monitored by tuning the fiber grating over the wavelength range of the optical data signal to measure an intensity of each channel. As the tunable grating scans the wavelength range of interest, it simultaneously changes the resonant cavity length of the etalon, thus allowing the etalon to effectively monitor the tunable grating with a wavelength outside the wavelength range of the optical data signal.

17 Claims, 1 Drawing Sheet

OPTICAL PERFORMANCE MONITOR

CROSS-REFERENCE TO RELATED APPLICATIONS

The present application claims priority from U.S. patent application Ser. No. 60/283,931 filed Apr. 17, 2001.

TECHNICAL FIELD

This present invention relates to optical performance monitors for use in optical communication systems.

BACKGROUND OF THE INVENTION

In wavelength division multiplexed (WDM) optical communication systems, many different wavelength channels are simultaneously carried by a single optical waveguide. In dense wavelength division multiplexed (DWDM) systems, up to 80 channels with a 50 GHz (0.4 nm) channel spacing can be accommodated in the 1525 nm to 1575 nm wavelength range (C band).

Performance of these systems is verified with an optical performance monitor (OPM) by monitoring the wavelength, power, and signal-to-noise ratio (SNR) of each of the DWDM channel signals. For example, an OPM located at the receiver line terminal is important for network commissioning and long term monitoring. An OPM located at the transmitter end can perform the added task of wavelength locking. Between the terminals, an OPM can measure deviations from the predefined channel wavelengths due to drifts or instabilities. For example, the OPM can be used to measure the successful reconfiguration of a tunable add/drop multiplexer or the imbalances in a recombined DWDM signal resulting from the individual channels traveling disparate paths throughout the network.

Traditionally, optical performance monitoring has been accomplished with optical spectrum analyzers, which for example, achieve high optical resolution by using a monochromator. In general, these optical spectrum analyzers are limited by the slow scanning speeds necessary for achieving high resolution and sensitivity.

An example of an optical spectrum analyzer with a faster response time is based on a tunable Fabry-Perot etalon. A Fabry-Perot etalon has two partially reflective mirrors, or surfaces, facing each other and separated by a predetermined gap that forms a cavity. The etalon has a periodic response to a multi-wavelength input signal; namely, it only transmits certain wavelengths for which the cavity is said to be in resonance. The spacing between the certain wavelengths, or fringes as they are commonly called, is referred to as the free spectral range (FSR) of the cavity and is a function of the reflectivity and the spacing between the mirrors. Typically, the etalon is tuned by varying the spacing between the mirrors.

However, optical spectrum analyzers based on tunable Fabry-Perot etalons are limited by the periodic response of the etalon, which makes it difficult to uniquely determine the wavelength of interest, particularly in the presence of multiple wavelengths. A second disadvantage relates to the fact that a Fabry-Perot filter with high resolution is limited in free spectral range, i.e. it cannot be tuned over a wide range of wavelengths at a high resolution. In fact, the mechanical and optical requirements imposed on a tunable Fabry-Perot filter for achieving the required rejection, stability, and wavelength setting accuracy make such devices excessively costly.

It is an object of the instant invention to provide an optical performance monitor that obviates the above disadvantages.

SUMMARY OF THE INVENTION

The present invention relates to an optical performance monitor having a tunable grating sandwiched between the first and second reflective surfaces of an etalon. Individual channels within the optical data signal are monitored by tuning the grating over the wavelength range of the optical data signal to measure an intensity of each channel. As the tunable grating scans the wavelength range of interest, it simultaneously changes the resonant cavity length of the etalon, thus allowing the etalon to effectively monitor the tunable grating with a wavelength outside the wavelength range of the optical data signal wavelength. Advantageously, this optical performance monitor provides high sensitivity, while simultaneously monitoring an optical data signal.

Accordingly, the present invention relates to an optical performance monitor comprising:

a first port for launching an optical data signal including a plurality of wavelength channels within a wavelength range;

a second port for launching a reference signal having a wavelength $\lambda$;

an etalon for receiving the optical data signal and the reference signal, the etalon having a free spectral range (FSR) and including a first partially reflective surface and a second partially reflective surface spaced apart by a length l for forming a resonant cavity for a signal having a wavelength substantially equal to $\lambda$;

a tunable grating optically disposed between the first and second reflective surfaces of the etalon for successively reflecting one channel at a time from the optical data signal;

a first detector for measuring an output of the tunable grating; and a second detector for measuring an output of the etalon.

Advantageously, the OPM of the instant invention has significantly lower cost considerations than the high quality, tunable etalons found in prior art OPMs.

Furthermore, relatively little splitting of the optical signal is required, thus requiring lower tap splits in the network. Since there is relatively low loss, a device in accordance with the present invention is optionally multi-functional. For example, the light extracted with a OPM in accordance with the instant invention may also be analyzed to determine polarization dispersion loss, etc.

BRIEF DESCRIPTION OF THE DRAWINGS

An exemplary embodiment of the present invention will now be described in conjunction with the accompanying drawing in which.

DETAILED DESCRIPTION

Figure 1:
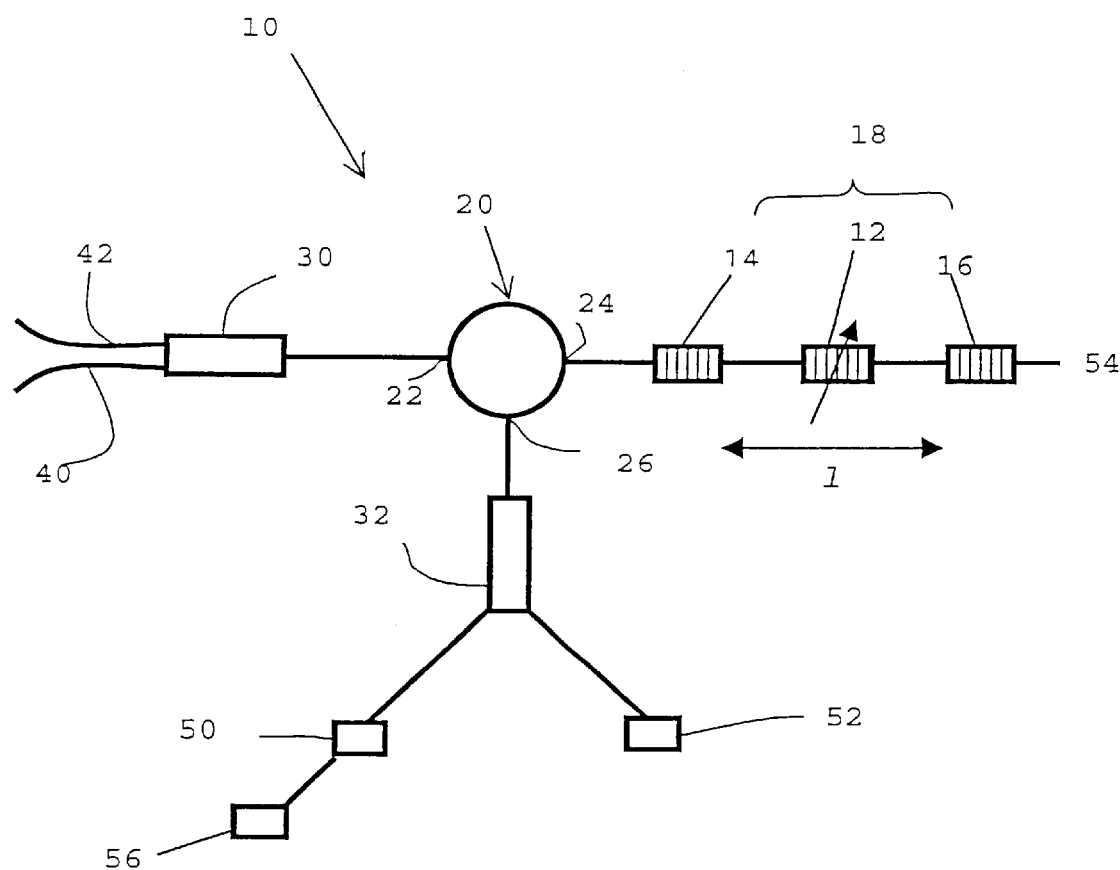
FIG. 1 is a schematic diagram of an optical performance monitor.

With reference to FIG. 1, an optical performance monitor 10 according with an embodiment of the present invention includes a tunable fiber grating 12 optically disposed between a first fixed fiber grating 14 and a second fixed fiber grating 16. Preferably, the tunable fiber grating 12 has a slit type function and is tuned by applying a strain, such as compression, to the fiber grating. The first fixed fiber grating 14 and the second fixed fiber grating 16 form an etalon 18, i.e. a Fabry-Perot etalon, having a cavity length l. Preferably, the first and second fiber gratings 14 and 16 are fiber Bragg gratings having a reflectivity between 10% and 80%. It is also preferred that the tunable fiber grating 12 be a tunable fiber Bragg grating. The fiber Bragg gratings are measurable in either transmission or reflection.

A three port circulator 20 is provided for transmitting optical signals to and from the etalon 18 and the tunable grating 12. More specifically, optical signals launched into a first port 22 of the circulator 20 are circulated to a second port 24 where they are transmitted to the tunable grating 12 and the etalon 18. The optical signals reflected from the tunable grating 12 or the etalon 18 are transmitted to the second port 24 of the circulator 20 where they are circulated to a third port 26. A first wavelength division multiplexer (WDM) 30 is optically coupled to the first port 22 for multiplexing an optical data signal 40 to be analyzed and a reference laser signal 42. A second WDM 32 is optically coupled to the third port 26 for demultiplexing the reflected signals into first and second sub-signals. Conveniently, the first and second detectors 50 and 52 are disposed to receive the first and second sub-signals, respectively.

Typically, the optical data signal 40 is a multiplexed data signal, including a plurality of wavelength channels, transmitted over a range of wavelengths, e.g. from 1525 nm to 1575 nm, while the laser signal 42 is out of this range, e.g. at 1300 nm. However, other wavelengths and wavelength ranges are also within the scope of the present invention. For example, the laser signal 42 may be just outside or overlapping an end of the wavelength range of the optical data signal 40. Preferably, the tunable grating 12 is tunable over the entire wavelength range of the optical data signal 40, while the fiber gratings 14 and 16 forming the etalon 18 reflect light having the wavelength corresponding to the laser signal 42.

For example, if the tunable grating 12 is tuned over a 50 nm range spanning from 1525 to 1575 nm, the spectral information of the optical signal in the range of 1525 to 1575 nm can be monitored by the first detector 50.

Similarly, if the fiber gratings 14 and 16 forming the etalon 18 reflect light having the wavelength corresponding to the laser signal 42, e.g. 1300 nm, then the output of the etalon 18 can be monitored at 1300 nm at the second detector 52. Since the output signal of the etalon 18 is dependent upon the cavity length l of the etalon 18, which in turn is dependent upon the degree to which the tunable grating 12 is tuned, the tunable grating 12 is effectively monitored with the etalon 18. In other words, if the laser source 42 corresponds to 1300 nm, then the spectral response of the etalon 18 at 1300 nm will vary with the applied strain to the tunable grating 12.

In general, the effective optical path length change $\Delta d$ of a tunable fiber grating, is related to the length of the fiber grating d, the wavelength of the fiber grating $\lambda_G$, and the tunable range of the fiber grating $\Delta\lambda_G$, by:

$$\frac{\Delta\lambda_G}{\lambda_G} = \frac{\Delta d}{d}$$

If the tunable grating 12 is tunable over 50 nm ($\Delta\lambda_G$) at 1550 nm ($\lambda_G$), and the length of the tunable grating is about 30 mm, the effective optical length change $\Delta d$ will be about 1 mm or 1000 $\mu$m.

The change in resonant wavelength of the etalon $\Delta\lambda_{FP}$ is related to the change in length of the etalon $\Delta l$, the length of the etalon cavity l, and the wavelength of the etalon $\lambda_{FP}$, by:

$$\frac{\Delta\lambda_{FP}}{\lambda_{FP}} = \frac{\Delta l}{l}$$

If the etalon wavelength $\lambda_{FP}$ is about 1300 nm, the effective optical length change $\Delta l$ is about 1 mm or 1000 $\mu$m, and the cavity length l is about 6 cm, then the change in resonant wavelength $\Delta\lambda_{FP}$ will be about 21 nm (3700 GHz).

The spacing between wavelengths in the reference signal, or FSR of the etalon is given by:

$$FSR = \frac{\lambda_{FP}^2}{2nl}$$

Wherein n is the refractive index, l is the length of the cavity, and $\lambda_{FP}$ is the wavelength of interest. For a wavelength of 1300 nm, a refractive index of about 1.5, and a cavity length of about 6 cm ($6\times10^7$ nm), the FSR will be as high as 0.009 nm (1.6 GHz). If the length of the cavity l is kept much larger than the maximum change in length $\Delta l$, e.g. 30 to 75 times larger, the FSR can be assumed to be constant throughout a small range of cavity lengths. Alternatively, various methods can be included for compensating for the small differences in fringe spacing.

Accordingly, the number of fringes of the resonant signal that are observed in the second detector 52 as the grating is tuned, is as high as 2000. Since the optical power of the monitor (1300 nm) is adjustable to high levels, this fringe counting is interpolated to provide wavelength accuracy better than 10 pm.

In operation, the optical data signal 40 and the laser signal 42 are coupled into the WDM 30 and are transmitted to the first port 22 of the circulator 20, where they are circulated and launched out of the second port 24. Both signals propagate to the etalon 18 and the tunable grating 12.

More specifically, the optical data signal will propagate through the first fixed fiber grating 14 unaffected and will be transmitted to the tunable fiber grating 12. If the tunable fiber grating 12 is tuned to reflect a predetermined channel of the optical data, that channel will be reflected by the grating 12 back to the second port 24 of the circulator 20, where it is circulated to the third port 26 and transmitted to the WDM 32. The WDM 32 substantially transmits the reflected signal to the first detector 50 where the intensity is measured (wavelength is unknown). Channels not reflected by the tunable grating 12 are transmitted through the second fixed fiber grating 16 and output an output port 54 of the monitor 10.

The reference laser signal 42 will also be transmitted to the first fiber grating 14. Although some of the laser signal 42 will be reflected and transmitted by the first and second fiber gratings 14 and 16, respectively, a significant portion may resonate within the etalon cavity 18, if the length of resonant cavity l is a multiple of $\lambda_{FP}/2$. A resonant signal transmitted from the etalon 18 through the first fiber grating 14 propagates back to the second port 24 of the circulator 20, where it is circulated to the third port 26 and transmitted to the WDM 32. The WDM 32 substantially transmits the resonant signal to the second detector 52 where the intensity at about 1300 nm is measured.

As the tunable fiber grating 12 is tuned over the wavelength range of the optical data signal 40, the first detector 50 will observe a plurality of peaks corresponding to the individual channels, e.g. I.T.U. channels, of the optical data signal, while the second detector 52 observes a much larger number of peaks corresponding to the fringes of the resonant signal. More specifically, as the phase of the etalon 18 changes, the second detector 52 observes a fringe, or a portion of a fringe, for each cavity length l proportional to $\lambda/2$. Knowing the cavity length of the etalon l, these fringes are counted to determine the relative wavelength(s) of the individual channels of the optical data signal 40. An absolute wavelength measuring device 56 can be included to determine a base wavelength, from which all of the gathered information can be used to construct an accurate spectral response.

Advantageously, the instant invention provides high sensitivity with respect to wavelength monitoring.

Of course, numerous other embodiments can be envisaged without departing from the spirit and scope of the invention.

We claim:

1. An optical performance monitor comprising:
   a first port for launching an optical data signal including a plurality of wavelength channels within a wavelength range;
   a second port for launching a reference signal having a wavelength $\lambda$;
   an etalon for receiving the optical data signal and the reference signal, the etalon having a free spectral range (FSR) and including a first partially reflective surface and a second partially reflective surface spaced apart by a length l for forming a resonant cavity for a signal having a wavelength substantially equal to $\lambda$;
   a tunable grating optically disposed between the first and second reflective surfaces of the etalon for successively reflecting one channel at a time from the optical data signal;
   a first detector for measuring an output of the tunable grating; and
   a second detector for measuring an output of the etalon.

2. The optical performance monitor according to claim 1, wherein the first and second reflective surfaces comprise first and second fiber Bragg gratings, respectively.

3. The optical performance monitor according to claim 1, further comprising a first wavelength division multiplexor (WDM) optically coupled between the etalon and the first and second ports for multiplexing the optical data signal and the reference signal.

4. The optical performance monitor according to claim 3, further comprising a circulator optically coupled between the first WDM and the etalon for directing signals from the first WDM to the etalon, and for directing signals from the etalon to the first and second detectors.

5. The optical performance monitor according to claim 4, further comprising a second WDM optically coupled between the circulator and the first and second detectors for directing the reflected channels from the optical data signal to the first detector and for directing the reference signal to the second detector.

6. The optical performance monitor according to claim 1, wherein the tunable grating is a tunable fiber Bragg grating.

7. The optical performance monitor according to claim 6 wherein the tunable fiber Bragg grating is tunable via an applied strain.

8. The optical performance monitor according to claim 7, wherein the resonant cavity length l is a function of the applied strain.

9. The optical performance monitor according to claim 7, wherein the applied strain is compression, which causes a change $\Delta l$ in the length l.

10. The optical performance monitor according to claim 7, wherein l is at least thirty times greater than $\Delta l$.

11. The optical performance monitor according to claim 10, wherein l is at least 5 cm and $\Delta l$ is at most 1 mm.

12. The optical performance monitor according to claim 1, wherein the first detector is for measuring intensity of each channel.

13. The optical performance monitor according to claim 12, wherein the second detector determines a number of fringes received from the etalon while the tunable grating is tuned between successive channels; and wherein the second detector determines a distance between two successive channels using the number of fringes received and the FSR of the etalon.

14. The optical performance monitor according to claim 13, further comprising an absolute wavelength detector for determining an absolute wavelength of one of the channels of the optical data signal, whereby absolute wavelengths of all of the channels can be determined.

15. The optical performance monitor according to claim 1, wherein the wavelength $\lambda$ is outside of the wavelength range.

16. The optical performance monitor according to claim 1, wherein the wavelength range of the optical data signal is about 1525 nm to about 1575 nm.

17. The optical performance monitor according to claim 16, wherein $\lambda$ is about 1300 nm.

* * * * *